April 11, 1950  A. C. SUTTON  2,503,975
ASPARAGUS CUTTING MACHINE
Filed Nov. 14, 1946  3 Sheets-Sheet 1

Inventor
Alton C. Sutton
Andrew F. Wintercorn
atty.

April 11, 1950     A. C. SUTTON     2,503,975
ASPARAGUS CUTTING MACHINE
Filed Nov. 14, 1946     3 Sheets-Sheet 2
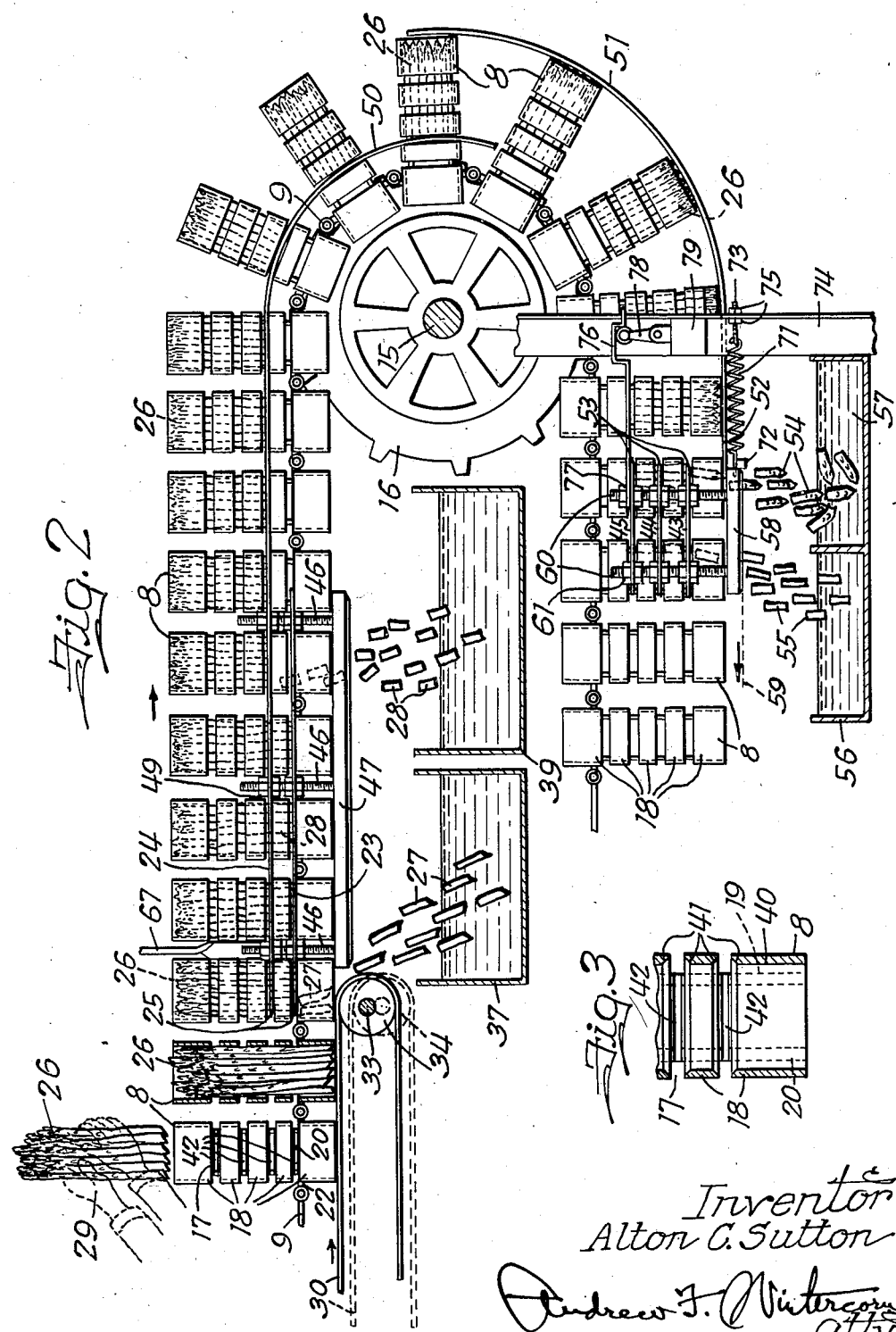
Inventor
Alton C. Sutton April 11, 1950 — A. C. SUTTON — 2,503,975
ASPARAGUS CUTTING MACHINE
Filed Nov. 14, 1946 — 3 Sheets-Sheet 3
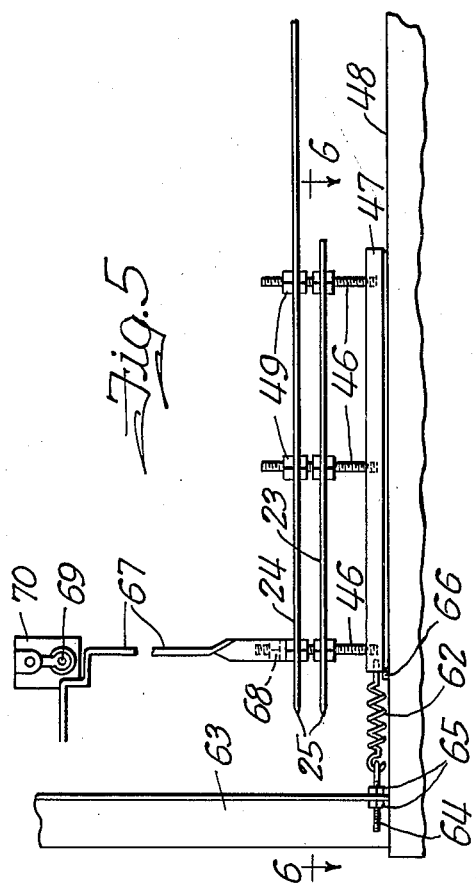
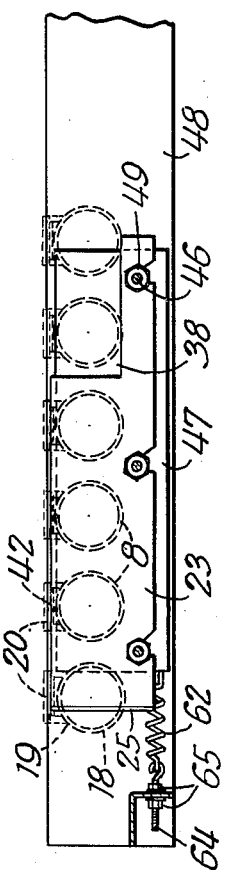
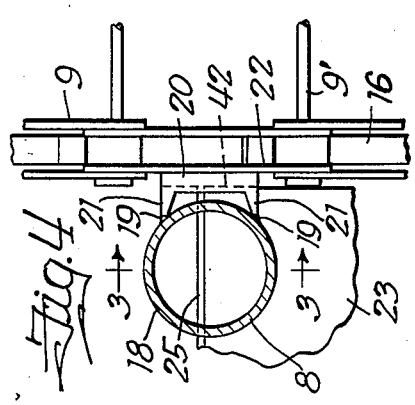
Inventor
Alton C. Sutton Patented Apr. 11, 1950

2,503,975

UNITED STATES PATENT OFFICE 2,503,975

ASPARAGUS CUTTING MACHINE

Alton C. Sutton, Rochelle, Ill.

Application November 14, 1946, Serial No. 709,757

4 Claims. (Cl. 146—82)

This invention relates to a new and improved asparagus cutting machine, and is more particularly concerned with a machine designed for butting, cutting and sorting.

One of the principal objects of my invention is to provide a machine in which a plurality of closely spaced cups are conveyed on an endless conveyor arranged so that there is an upper flight where the cups may be conveniently filled by hand from either or both sides of the conveyor, the asparagus being inserted in the cups butt end down and being supported on their butt ends on a conveyor belt that is adjustable in elevation relative to the cups to vary the length of tough butt ends that will be cut off in the first cutting operation when the cups are conveyed past a first set of knife blades that operate through transverse slots that are provided in spaced parallel relation in the cups.

Another important object of my invention consists in the provision of two knife blades in connection with the upper flight, the lower blades severing the tough butt ends which are immediately dropped into a separate conveyor trough and this blade being elongated so as to cooperate with the upper blade in retaining the standard center cuts until those portions can be discharged into another conveyor trough. The upper blade is elongated further to retain the rest of the stalks and curbed at its outer end to continue to support the stalks while the cups move in an arc downwardly toward the lower flight, there being a lower set of knife blades for the lower flight, the lowest blade of which is elongated and has an upwardly curved end portion disposed in radially outwardly spaced relation to the curved end portion of the upper blade of the upper set of knife blades so as to support the stalks by their tip ends for the remainder of their travel in the lower flight, the other blades of the lower set making a tip cut and one or more center cuts, depending on the length of the stalks, the tip cuts being discharged separately and segregated, if desired, from the center cuts.

Still another important object of my invention is to provide in a machine of the kind described, a safety device for automatically shutting off the machine in the event any obstruction gets into the cups, such as a stick of wood or a file used in sharpening the knives that are used for cutting the asparagus, whereby to prevent serious damage to the machine.

A further feature of the invention consists in the provision of transversely slotted cups, the spaced ring sections of which are carried on back plates which have grooves provided in register with the slots to guide the inner longitudinal edge portions of the knife blades to prevent buckling and keep these thin blades from rubbing on the ring sections of the cups and causing unnecessary wear and imposing a drag upon the operation of the machine.

A further feature consists in the provision of transversely slotted cups of the kind mentioned, the ring sections of which have the bores thereof flared at the ends next to the slots to help insure that the cut portions of the stalks after the cutting operations will not be apt to get stuck but will be promptly discharged as and when intended.

The invention is illustrated in the accompanying drawings, in which—

Fig. 2 is an enlargement of one end portion of the machine showing certain portions in section to better illustrate the construction;

Fig. 3 is a fragmentary sectional detail on the line 3—3 of Fig. 4, of a portion of a cup shown on an enlarged scale illustrating the flaring of the ends of the bores in the ring sections of the cup and the relationship of the slots between the ring sections to the grooves in the supporting back plate;

Fig. 4 is a plan view of one of the cups showing the mounting of the back plate on a link of the conveyor chain;

Fig. 5 is a side view of the slidable upper knife assembly shown on an enlarged scale, and Fig. 6 is a horizontal section on the line 6—6 of Fig. 5.

The same reference numerals are applied to corresponding parts throughout the views.

Figure 1:
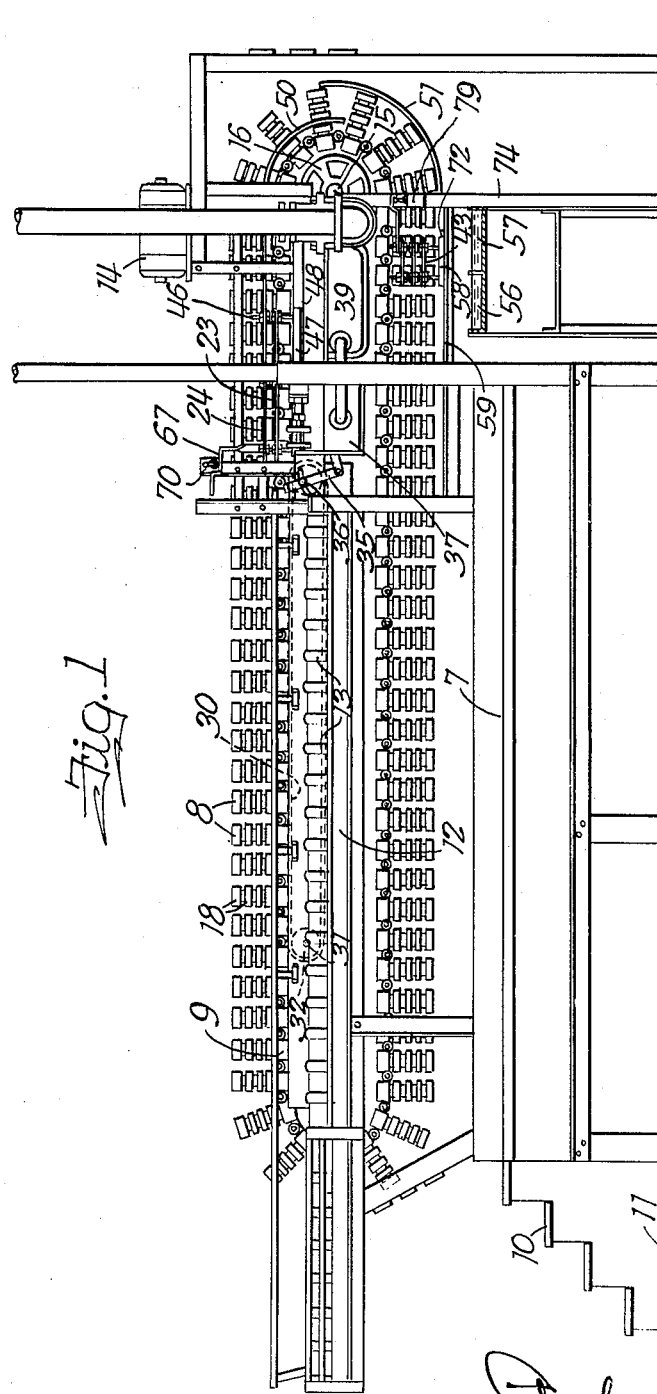
Fig. 1 is a side view of an asparagus cutting machine made in accordance with my invention.

In the cutting of asparagus preparatory to canning, there is a so-called "butting" operation in which about 2½" of the tough bottom or butt ends are cut off as waste, the length to be cut off being determined by a so-called "snap" test made on a number of samples from a given harvest. Then above and beyond that, about 1¼" is cut from each stalk for what are known as standard center cuts, which are of low quality usable for soups and purees. Next, there is a 2" tip cut which is the choice one, and, there are 1½" center cuts, two or three to a stalk, depending on the length, which are of medium quality, better than the 1¼" standard center cut. The present machine is designed to make all of these cuts automatically, the machine being easily adjustable to cut different lengths of tough butt ends as different batches of cut asparagus being handled requires. The machine also automatically segregates the butt ends from the standard center cuts and also automatically segregates the tip cuts from the center cuts, or not, as desired.

Referring to the drawings, the reference numeral 7 designates a raised platform on which the attendants stand while placing bunches of asparagus stalks in the cups 8 of the machine, there being preferably two rows of cups 8 disposed in parallel relation carried on opposite sides of an endless conveyor chain 9, and there being preferably two platforms 7 one on each side of the machine for the attendants to stand upon while filling the cups with cut asparagus. Steps 10 extend upwardly to the platforms 7 from the floor level 11. The cut asparagus is delivered to the attendants on the tables 12 usually in boxes or baskets which can be rolled from one end of the table to the other on rollers 13. The tables 12 are preferably inclined to facilitate removal of the cut asparagus from the containers. The conveyor chain 9 is suitably driven by an electric motor 14 through a reduction gearing unit (not shown), drive being transmitted to a cross-shaft 15 at one end of the machine carrying sprockets 16 meshing with the endless chain conveyor 9, and idler sprockets being provided on another cross-shaft at the other end of the machine for support of the chain conveyor 9 at that end. The cups 8 are open at the top and bottom and are slotted transversely, as indicated at 17, through the full diameter, so that each cup consists of a plurality of axially spaced ring sections 18, these spaced ring sections being welded, as indicated at 19 in Fig. 4, to vertical back plates 20 that are of channel shaped cross-section and have their flanges 21 directed toward the ring sections and welded thereto at their outer edges at two widely circumferentially spaced points on each ring section. The plates 20 are welded or otherwise suitably secured to links 22 of the endless conveyor 9, in right angle relationship to said links. As indicated in Fig. 4, the conveyor 9 consists of two parallel chains, each of which carries cups 8 on the outer sides of its links, the links of the two chains being cross-connected by pivot pins 9'. The slots 17 are provided to receive knife blades 23 and 24 which are sharpened at one end, as indicated at 25, to cut through the bunches of stalks 26 of asparagus in the movement of the cups 8 with the conveyor 9 relative to the blades 23 and 24. The fact that the blades 23 and 24 operate in the two lowermost slots 17 accounts for the cutting of the tough butt end portions 27 and the 1¼" standard center cuts 28, as disclosed in Fig. 2, because the stalks 26, as indicated at 29 in Fig. 2, are inserted in the cups butt end down. An endless conveyor belt 30 extends throughout a substantial portion of the length of the upper flight of the conveyor under the cups 8 and is driven in any suitable manner with the conveyor 9 at the same lineal speed and in the same direction as the conveyor 9, the shaft 31 carrying the drive pulley 32 at one end being in fixed bearings but the shaft 33 carrying the idler pulley 34 at the other end being mounted in vertically adjustable bearings adjustable up or down with an eccentric adjusting handle 35 and lock nut 36. As shown in Fig. 2, the vertically adjustable pulley 34 is located with its shaft 33 directly below the sharpened ends 25 of the knife blades 23 and 24. With this arrangement and combination, it is obvious that the length of tough butt ends 27 to be cut off can be varied as desired by adjustment up or down of the pulley 34 to give the correct distance between the belt 30 and blade 23. The blades 23 and 24 are, of course, spaced for the 1¼" standard center cuts. The belt 30 therefore supports the asparagus stalks 26 up to the point where the first cutting operation is performed by the blades 23 and 24, without scuffing the butt ends, because there is no relative movement between the cups 8 and the belt 30. The cut off butt ends 27 drop out of the lower ends of the cups 8 immediately after the blades 23 and 24 pass through the lower portion of the cups, and a conveyor trough 37 or chute into which water is continuously discharged in one direction catches and serves to convey these tough butt end portions to waste. The blades 23 and 24 are elongated, as indicated in Fig. 2 and as also illustrated in Figs. 5 and 6, the blade 23 extending throughout enough of the length of the conveyor 9 to span at least four cups 8 and, as shown in Fig. 6, being cut away, as at 38, to permit discharge of the standard center cuts 28 into another chute or conveyor 39 into which water is also preferably discharged at one end to carry the standard center cuts 28 to a suitable receptacle where an attendant removes the same periodically for processing or packing, these cuts being of a lower quality usable, as stated before, for soups and purees.

The cups 8, as shown in Fig. 3, have the bores 40 of the ring sections 18 all of a common size and concentrically arranged and the bores are flared at their ends, as indicated at 41, this relief being found to be of an advantage in freeing the cut portions of the stalks and insuring their dropping through the bores much more readily. For instance, if an edge portion on the cut end of a stalk in sliding through the bore were to encounter a square shoulder at any one of the slots 17, it is obvious that the stalk would be stopped, and it would in turn offer resistance to the movement of other neighboring stalks in contact with it, and in that way, it is easy to see that several jammed stalks might cause a whole bunch to jam and interfere with the proper functioning of the machine. That eventuality is eliminated simply by flaring the ends of the bores, as shown at 41.

The back plates 20 have their flanges 21 cut away at the slots 17 to receive the knife blades so that they can cut to the full diameter of the cups 8. Grooves 42 are provided in the back plates 20 in planes normal to the axis of the cups 8 and approximately in the middle of the slots 17 to cooperate with the inner longitudinal edge portion of the various blades, namely, blades 23 and 24, and also blades 43, 44, and 45, to support and guide the edge portion of these blades in the movement of the cups relative thereto and thus prevent buckling of the blades and avoid the likelihood of blades rubbing on the sides of the slots 17 and setting up considerable frictional drag upon the operation of the machine, not to mention the wearing away of the blades and cups which such faulty operation would involve. The blades 23 and 24 are supported at their outer longitudinal edge portions on screw threaded studs 46 projecting upwardly from a slide 47 which in turn rests on a suitable supporting ledge 48 provided on the frame of the machine. Nuts 49 are threaded on the studs 46 against the tops and bottoms of each of the blades to clamp the blades in accurately adjusted fixed spaced relationship.

The blade 24 extends far beyond the end of the blade 23, as shown in Fig. 2, whereby to support what is left of the stalks 26 after the tough butt ends 27 and the standard center cuts 28 have been cut off, and this extension of blade 24 has an arcuately bent end portion 50 which extends in an arc concentric with the shaft 15 through approximately 90° to continue to support the stalks of reduced length while the cups 8 move in an arc from the upper flight of conveyor 9 downwardly toward the lower flight. When the cups 8 reach the mid position between the upper and lower flights, the curved end 51 of another blade 52 which extends in an arc concentric with the curved end 50 of the blade 24, takes over the support of the stalks 26, which from this point on travel tip end down. The tips slide lightly along the inside of the curved end portion 51 of the blade 52, because the stalks do not reach a vertical position until they are actually in the lower flight, and soon thereafter the sharpened ends 53 of the blades 43—45 cut through the stalks in the cups, so that there is no likelihood of any noticeable scuffing on the outer ends of the tender tip cuts 54 that are cut off by the blade 43. The center cuts 55 from between the blades 43 and 44 and from between blades 44 and 45 are discharged into a chute or conveyor 56 next to the chute or conveyor 57 that catches the tip cuts 54. A stream of water may be discharged into one end of the chutes 56 and 57 to conduct the cuts 54 and 55 to suitable receptacles. Of course, where a stalk is not as long as the cups 8, it is obvious that there may be little more than a tip cut left in such a stalk after the tough butt end 27 and standard center cut 28 are cut therefrom. Such shorter stalks will, of course, gravitate to the lower ends of the cups 8 as the cups move into the lower flight and the tip cut will be separated from whatever center cut or cuts there may be.

The blades 43, 44 and 45 are mounted on another slide 58, similar to the slide 47, slidably supported on a suitable ledge 59 provided therefor on the frame of the machine. The threaded studs 60 are like the studs 46 and have the blades 43—45 clamped thereto by means of nuts 61. The blades 43—45 are supported on the studs 60 by their outer longitudinal edge portion and slide at their inner longitudinal edge portion in the grooves 42 in the back plates 20 as previously described in referring to blades 23 and 24. The blade 52 is suitably fixedly supported on the frame. The slides 47 and 58 are both movable against the resistance of spring means so as to permit the blades carried thereby to yield in the event they encounter some foreign object, such as a stick of wood or a file used by the workmen to sharpen their knives in harvesting the asparagus in the field, such objects being quite apt to be placed in the cups 8 with the bunches of cut asparagus by careless attendants when filling the cups. Obviously, serious damage could be done to the machine if it were not stopped immediately when something like that occurred. A coiled tension spring 62 is shown in Figs. 5 and 6 connected to the slide 47 at one end and to a stationary frame member 63 at the other end, a bolt 64 and adjusting nuts 65 permitting adjustment of the spring tension so that the blades 23 and 24 will not yield when cutting asparagus, but only in the event a stick of wood or a metal object comes in contact with the sharpened end 25 of either of the blades 23 and 24. A stop projection 66 on the ledge 48 permits tightening of the spring 62 to whatever extent is necessary. In the event a foreign object causes the blades 23 and 24 to back up against the action of the spring 62, an arm 67 which is suitably clamped onto one of the studs 46, as indicated at 68 in Fig. 5, is arranged to move the arm 69 of a limit switch 70 that is connected in series in the circuit for the motor 14, whereby to break the circuit and immediately stop the machine. In a similar manner, the motor 14 will be stopped if a foreign object encounters either of the blades 43—45, the slide 58 having a coiled tension spring 71 connected thereto which holds the slide yieldingly in contact with a stop projection 72 provided on the ledge 59. A bolt 73 connects the spring 71 with a stationary frame member 73 and is adjustable by adjustment of the nuts 75 to vary the spring tension as desired. The arm 76, clamped as indicated at 77 to one of the studs 60, is arranged to move the arm 78 of another limit switch 79 in the event the knife assembly 43—45 backs up against the resistance of the spring 71 by reason of one of the blades having encountered a foreign object in one of the cups 8. The switch 79, like the switch 70, is also connected in series in the circuit for motor 14 so as to stop the motor immediately and prevent damage to the machine.

While I have described the invention as applied to cutting asparagus, it will now be evident that it is applicable to cutting various stalk crops, such as celery and rhubarb, and might also be used for making fine or coarse cuts on other vegetables, like carrots, beans, et cetera, and also certain fruits.

It is believed the foregoing description conveys a good understanding of the objects and advantages of my invention. The appended claims have been drawn to cover all legitimate modifications and adaptations.

I claim:

1. A stalk cutting and grading machine of the kind described comprising a frame, an endless conveyor operable thereon having upper and lower horizontally extending flights providing for upper and lower passes of the stalks in the cutting and grading operations, stalk holding cups carried at spaced intervals by the endless conveyor, each of said cups being adapted for holding stalks in upstanding position and inverted, said cups being divided into a number of axially spaced sections along several horizontal planes, a stationary horizontal cutter blade supported on said frame adjacent the upper flight of said conveyor to operate in between two of the lower sections of said cups while they travel on the upper pass, said blade being elongated in the direction of travel of the conveyor, an extension of said blade having a curved extremity for support of uncut remaining portions of stalks in said cups until the cups reach at least the mid-point of the turn at one end of said frame going from the upper pass to the lower pass, another curved element at the latter end of said frame cooperating with the open outer ends of the cups to assume support of the inverted uncut remaining portions of the stalks as the cups travel into the lower pass, and a plurality of other stationary horizontal cutter blades which are also elongated in the direction of conveyor travel and provided of different lengths and supported on said frame adjacent the lower flight of said conveyor to operate in between the sections of said cups while they travel on the lower pass arranged to cut simultaneously the stalks into portions of predetermined lengths and drop different portions at spaced stations the spacing of which is determined by the spacing of the trailing ends of said last named blades.

2. A machine as set forth in claim 1 including at least one stationary, elongated, horizontal cutter blade on said frame spaced below the first mentioned cutter blade arranged to operate between two lower sections of the cups as they move on the upper pass so as to cut off one lower end portion of the stalks which is dropped at one station, and also cut off another lower end portion above that which is dropped at another station the spacing of which from the first station is determined by the length of said blade.

3. A stalk cutting and grading machine of the kind described comprising a frame, an endless conveyor operable thereon having upper and lower horizontally extending flights providing for upper and lower passes of the stalks in the cutting and grading operations, stalk holding cups carried at spaced intervals by the endless conveyor, each of said cups being adapted for holding stalks in upstanding position and inverted, said cups being divided into a number of axially spaced sections along several horizontal planes, a stationary horizontal cutter blade supported on said frame adjacent the upper flight of said conveyor to operate in between two of the lower sections of said cups while they travel on the upper pass, said blade being elongated in the direction of travel of the conveyor, an extension of said blade having a curved extremity for support of uncut remaining portions of stalks in said cups until the cups reach at least the mid-point of the turn at one end of said frame going from the upper pass to the lower pass, another curved element at the latter end of said frame cooperating with the open outer ends of the cups to assume support of the inverted uncut remaining portions of the stalks as the cups travel into the lower pass, and another stationary horizontal cutter blade supported on said frame adjacent the lower flight of said conveyor to operate in between two of the sections of said cups while they travel on the lower pass, said blade being elongated in the direction of travel of the conveyor.

4. A machine as set forth in claim 3 including at least one stationary, elongated, horizontal cutter blade on said frame spaced below the first mentioned cutter blade arranged to operate between two lower sections of the cups as they move on the upper pass so as to cut off one lower end portion of the stalks which is dropped at one station, and also cut off another lower end portion above that which is dropped at another station the spacing of which from the first station is determined by the length of said blade.

ALTON C. SUTTON.

REFERENCES CITED

The following references are of record in the file of this patent:

UNITED STATES PATENTS

| Number | Name | Date |
|---|---|---|
| 1,091,787 | Adams | Mar. 31, 1914 |
| 1,190,303 | Langton | July 11, 1915 |
| 1,155,455 | Wegner | Oct. 5, 1915 |
| 1,967,240 | Guest | July 24, 1934 |
| 1,992,688 | Bonvalet | Feb. 26, 1935 |
| 2,341,052 | Turmair | Feb. 8, 1944 |

FOREIGN PATENTS

| Number | Country | Date |
|---|---|---|
| 589,169 | Germany | Dec. 5, 1933 |